United States Patent
Wada

(10) Patent No.: US 7,050,941 B2
(45) Date of Patent: May 23, 2006

(54) TROUBLE COUNTERMEASURE SUPPORT SYSTEM AND TERMINAL DEVICE CONNECTED TO THE SAME

(75) Inventor: Atsushi Wada, Kyoto (JP)

(73) Assignee: Arkray, Inc., Kyoto (JP)

( * ) Notice: Subject to any disclaimer, the term of this patent is extended or adjusted under 35 U.S.C. 154(b) by 29 days.

(21) Appl. No.: 10/517,162

(22) PCT Filed: Jun. 6, 2003

(86) PCT No.: PCT/JP03/07174

§ 371 (c)(1),
(2), (4) Date: Dec. 7, 2004

(87) PCT Pub. No.: WO03/105039

PCT Pub. Date: Dec. 18, 2003

(65) Prior Publication Data

US 2005/0177341 A1    Aug. 11, 2005

(30) Foreign Application Priority Data

Jun. 7, 2002   (JP) ............................... 2002-167786

(51) Int. Cl.
*G06F 11/30* (2006.01)
(52) U.S. Cl. ......................................... 702/185; 714/25
(58) Field of Classification Search ................ 702/183, 702/184–185, 187–188; 714/2, 25
See application file for complete search history.

(56) References Cited

U.S. PATENT DOCUMENTS

| | | | |
|---|---|---|---|
| 6,249,755 B1 * | 6/2001 | Yemini et al. | 702/183 |
| 2003/0120465 A1 * | 6/2003 | Mets et al. | 702/187 |
| 2004/0019460 A1 * | 1/2004 | Okuno et al. | 702/187 |

FOREIGN PATENT DOCUMENTS

| | | |
|---|---|---|
| JP | 10-124477 | 5/1998 |
| JP | P2001-282944 A | 10/2001 |
| JP | P2002-24322 A | 1/2002 |
| JP | P2002-154085 A | 5/2002 |

* cited by examiner

*Primary Examiner*—Edward Raymond
(74) *Attorney, Agent, or Firm*—Hamre, Schumann, Mueller & Larson, P.C.

(57) ABSTRACT

An online manual capable of efficiently identifying a trouble cause and not requiring trouble for updating. A service engineer (SE) connects an SE terminal to a service support system (1) and transmits a trouble event caused in a device to be repaired. In a judgment route data storage section (16), judgment materials for identifying a symptom cause are stored in the descending order of the goodness of fit. A data extraction section (20) extracts the judgment material in that order and represents it to the SE terminal. When the SE selects a judgment material matched with the state of the device to be repaired, the data extraction section (20) extracts a countermeasure action content corresponding to the judgment material from the countermeasure-action data storage section (11), an action data storage section (12), and a content storage section (13) and displays it on the SE terminal.

12 Claims, 15 Drawing Sheets

FIG. 2A

| Model name | Handling procedure | Action |
|---|---|---|
| HA-8160 | SR0302 | A011 |
| HA-8160 | SR0302 | A239 |
| HA-8160 | SR0302 | A021 |
| HA-8160 | SR0302 | A012 |
| HA-8160 | SR0201 | A031 |

FIG. 2B

| Model name | Action | Hour | Price of parts | Hyperlink |
|---|---|---|---|---|
| HA-8160 | A011 | 8 | 1600 | a011.htm |
| HA-8160 | A239 | 3 | 0 | a239.htm |
| HA-8160 | A021 | 5 | 0 | a021.htm |
| HA-8160 | A012 | 20 | 0 | a012.htm |

FIG. 2C

| Report No. | Model name | Equipment ID | Work data | Symptom | Diagnostic material | Cause | Handling procedure |
|---|---|---|---|---|---|---|---|
| 123456 | HA-8160 | 654321 | 2002/3/26 | T11 | J05 | R03 | SR0301 |
| 123455 | GA-1160 | 354320 | 2002/3/23 | E03 | J01 | R05 | SR0503 |
| 123453 | HA-8160 | 654321 | 2002/3/20 | T13 | J03 | R11 | SR1101 |
| 123452 | HA-8160 | 654321 | 2002/3/12 | T11 | J02 | R03 | SR0302 |

FIG. 2D

| Model name | Handling procedure | Cause-based MTBF | | MTBF | | Completion report | MTTR | Cost |
|---|---|---|---|---|---|---|---|---|
| | | Number of days | Number of samples | Number of days | Number of samples | | | |
| HA-8160 | SR0211 | 386 | 33 | 198 | 124 | 123121 | 48 | 56,000 |
| GA-1160 | SR0302 | 193 | 23 | 123 | 53 | 123211 | 36 | 25,000 |
| HA-8160 | SR0502 | 123 | 32 | 112 | 46 | 112321 | 38 | 32,000 |
| HA-8160 | SR0402 | | 0 | 19 | 1 | 121239 | 64 | 98,000 |

FIG. 3A

| Model name | Symptom | Diagnostic material | Cause |
|---|---|---|---|
| HA-8160 | T11 | J23 | R01 |
| HA-8160 | T11 | J02 | R02 |
| HA-8160 | T11 | J12 | R03 |

FIG. 3B

| Model name | Cause | Handling procedure |
|---|---|---|
| HA-8160 | R02 | SR0302 |
| HA-8160 | R02 | SR0201 |
| HA-8160 | R02 | SR0408 |
| HA-8160 | R02 | SR0409 |
| HA-8160 | R03 | SR0502 |

Trouble shooter for HA-8160

What kind of problems ?
(Causes of failures are diagnosed here by symptoms)

---

- Problems about data
  - Value is high
  - Value is low
  - Value varies
  - R Time is fast or slow
  - R Time varies
  -
- Warning message of equipment is displayed
  - E01 Power down
  - E02 Printer error
  - E03 Rack full
  - E04 Can't washing
  - T01 flash memory
  - T02 COMM PMC1
  - T10 High pressure
  - T11 Low flowrate
  - T03 A/D...

FIG. 5

T11 Low flowrate (Occurrence conditions)
- Pressure of high pressure piping system is lower than 8 kg/cm$^2$
- Pressure drop of high pressure piping system is greater than 70kg/cm$^2$
- Detected only during measurement Confirmation items
- No.1 J23:Liquid leak from injection valve
- No.2 J02:Bubbles are being generated in flow channel of A liquid
- No.3 J12:Liquid leak at liquid pumping unit
- No.4 J01:Contamination of flow channel of B liquid
- No.5 J09:Liquid leak of priming waste liquid line
- No.6 J04:Concurrence with T18 Drain over B
- No.7 J24:Unusual sound from manifold electromagnetic valve
- No.8 J05:Concurrence with T41 Dilution leak
- No.9 J17:Attachment portion of sampling loop is loose

FIG. 6

(R03) Cause    Path(T11-J02)

Connection between eluant tube and rear panel ⇒ Bad connection

Handling procedure   Change to order of MTBF   Change to order of Cost
(order of MTTR)

| | |
|---|---|
| No.1<br>(SR0302) | MTTR:36(min)  MTBF:193(day)  Price of parts:¥1,600  Technical fee:¥25,000 |
| | 1. [A011] Replacing seal (8min)<br>2. [A239] Retightening connection between eluant tube and rear panel (3min)<br>3. [A021] Confirming piping pressure (5min)<br>4. [A012] Confirming measurement operation (20min) |
| No.2<br>(SR0301) | MTTR:61(min)  MTBF:348(day)  Price of parts:¥11,200  Technical fee:¥25,000 |
| | 1. [A011] Replacing seal (8min)<br>2. [A239] Retightening connection between eluant tube and rear panel (3min)<br>3. [A032] Replacing piping from high pressure valve to damper (15min)<br>4. [A024] Replacing manifold (10min)<br>5. [A021] Confirming piping pressure (5min)<br>6. [A012] Confirming measurement operation (20min) |
| No.3<br>(SR0303) | MTTR:95(min)  MTBF:???(day)  Price of parts:¥68,800  Technical fee:¥25,000 |
| | 1. [A011] Replacing seal (8min)<br>2. [A239] Retightening connection between eluant tube and rear panel (3min)<br>3. [A032] Replacing piping from high pressure valve to damper (15min)<br>4. [A024] Replacing manifold (10min)<br>5. [A043] Washing nozzle filter of each bottle (18min)<br>6. [A130] Retightening screws of each piping tube (6min)<br>7. [A258] Plugging and unplugging connector of pressure testing board (5min)<br>8. [A008] Replacing plunger sea (5min)<br>9. [A021] Confirming piping pressure (5min)<br>10. [A012] Confirming measurement operation (20min) |

FIG. 7

(SR0302) Work procedure             Path(T11-J02-SR0302)

MTTR:36(min)   MTBF:193(day)   Price of parts:¥1,600   Technical fee:¥25,000

1. [A011] Replacing seal (8min)

2. [A239] Retightening connection between eluant tube and rear panel (3min)

3. [A021] Confirming piping pressure (5min)

4. [A012] Confirming measurement operation (20min)

[A011] Replacing seal (8min)

Replace seal 60 of manifold

The seal 60 attached inside the manifold is a membrane to remove bubbles in the eluant. When the seal becomes contaminated, the pump flow rate becomes varied. This causes errors or troubles to occur. Please replace this seal once every 3 months or when 3000 measurements are exceeded after the previous replacement.

Items to prepare: Seal 60 (product code: 10639), tweezers, crosshead screwdriver, spanner (double open end) 6-8

1 Open the temperature control box
- Confirm [Standby screen] is displayed.
- Open the front panel.
- Move the operation panel to the right as you face it.
- Open the temperature control box.
  · At this time, a message "Cover Open (Can't start)" to warn that the temperature control box is open is displayed, but is automatically removed when the cover is closed after work ends.

Standby WHOLE 0001
Counter F.050 C:0050

Operation panel

Temperature control box

- 4 Maintenance index
- 4-1 Outline of maintenance
- 4-2 Daily maintenance
- 4-2 Replacement of consumables
  4-3-1 Replace eluants 60A, 60B, 60C
  4-3-2 Replace laky blood washing solution 60H
  4-3-3 Replace thermal recording paper
  4-3-4 Replace light source lamp
  4-3-5 Replace thermal recording paper
  4-3-6 Replace light source lamp
  4-3-7 Replace thermal recording paper
  4-3-8 Replace light source lamp
  4-3-9 Replace thermal recording paper
  4-3-10 Replace light source lamp

| Repair report | 800391949 | Completed |
|---|---|---|

⊙ A) Business trip　○ B) Take home

| | |
|---|---|
| Receipt number: | 999999996 |
| Customer code: | 888888 |
| Customer name: | xxx Hospital |
| Tel: | 075-xxx-xxx |
| Station code: | 1234 |
| Station: | Kyoto SS |
| Handling personnel code: | 888 |
| Handling personnel: | △△△△ |
| Product name: | Adams A1C |
| Product code: | HA-8160 |
| Equipment ID: | HA8160109999 |
| ROM Ver: | 1.08 |

Receipt date [2001/11/20]　Delivery date [20011029]
Work date [2001/11/20]　Work time [13:30] ~ [14:15]

| | |
|---|---|
| Path input: | [T11 ▽]　[J02 ▽]　[SR0302 ▽]　[New creation] |
| Main symptom: | T11:flowrate<br>Bubbles are being generated in flow channel of A liquid |
| Main cause: | Eluant tube, Connecting portion of rear panel ⇒ Bad connection |
| Content of treatment: | · Replacing seal<br>· Retightening connection between eluant tube and rear panel |

FIG. 10

Symptom:T11:flowrate

Determine cause

Cause location:Eluant tube, Connecting portion of rear panel

Select cause (stress)

| Bad connection ▽ |
| --- |
| Wear |
| Deformation |
| Grease loss |
| Disconnection |
| Short circuit |
| Slip off |

[ Back ] [ Next ]

FIG. 14

Symptom:T11:flowrate

Determine cause

Cause:Eluant tube, Connecting portion of rear panel ⇒ Bad connection

Fill in diagnostic criteria

Existing diagnostic criteria

No. 1 J23:Liquid leak from injection valve
No. 2 J12:Liquid leak at liquid pumping unit
No. 3 J01:Contamination of flow channel of B liquid
No. 4 J09:Liquid leak of priming waste liquid line
No. 5 J04:Concurrence with T18 Drain over B
No. 6 J24:Unusual sound from manifold electromagnetic valve
No. 7 J05:Concurrence with T41 Dilution leak
No. 8 J17:Attachment portion of sampling loop is loose Input column for diagnostic criteria to determine cause ※ Bubbles are being generated in flow channel of A liquid

FIG. 15

TROUBLE COUNTERMEASURE SUPPORT SYSTEM AND TERMINAL DEVICE CONNECTED TO THE SAME

TECHNICAL FIELD

The present invention relates to a monitoring system to monitor remotely, via a communication network, various equipment such as clinical laboratory test equipment for predicting e.g. equipment failures.

BACKGROUND ART

In the case where a failure occurs in a machine or the like, a trouble shooting manual and a service manual (hereafter, collectively referred to as simply manual) are used for determining causes of the failure and repair methods, depending on the failure symptoms. For quickly restoring the machine or the like from failures, it is important whether items to examine causes of failures are arranged in a proper order in a manual or not. For example, with respect to a certain failure symptom, if causes that develop this symptom more frequently are described earlier in a reference order in the manual, it is possible to shorten the time required for a user or a service engineer of the equipment to find the causes of the failure, enabling quick recovery.

Accordingly, it is preferable that among causes of failures presumable from failure symptoms, such causes of failures as having higher probabilities together with repair procedures effective for such causes of failures are so described in the manual as to be arranged with priority in the manual. Conversely, a manual that is not described in such manner has a problem in that it takes a long time to determine causes of failures. Assume the case, for example, where check items not directly relevant to determine causes of failures are described with priority in a manual, and moreover where procedures to implement the checking are complicated and require much time. Considering that many service engineers do repair work using the manual in such case, an overall waste of time becomes too much to ignore.

In order to update manuals, however, a lot of labor and time are needed. Thus, conventionally, manuals generally are updated only in cases where they become non-functional as manuals unless they are updated, such as in the case where equipment specifications have been subjected to major changes. In other words, in the case of minor changes, manuals are sometimes not updated. Besides, updating of documents for new equipment models requires much time and manual work.

DISCLOSURE OF THE INVENTION

The present invention has thus been made to solve such problem. Its object is to realize a support system for trouble handling that can provide an online manual that enables efficient determination of causes of failures and does not require laborious work for updating.

For achieving the above-described object, a support system for trouble handling according to the present invention includes: a diagnostic path storage unit to store a list of event data of troubles capable of occurring in an equipment, a list of data of diagnostic material for determining causes of the events, and a list of handling procedure data corresponding to the causes, and further store interrelations among these data; a diagnostic material presentation unit to receive event data input thereto, and to extract, from the diagnostic path storage unit, data of diagnostic material relating to the event data input thereto, and further to output the extracted data of diagnostic material; and a handling procedure presentation unit to receive some of the data of diagnostic material output by the diagnostic material presentation unit and selectively input thereto, and to extract, from the diagnostic path storage unit, handling procedure data relating to such cause as determined by the data of diagnostic material selectively input thereto, and further to output the extracted handling procedure data, wherein the data of diagnostic material for respective event data are stored in the diagnostic path storage unit with closeness-of-fit added thereto, and wherein the diagnostic material presentation unit outputs the extracted data of diagnostic material in order according to the closeness-of-fit.

It is to be noted here that "closeness-of-fit" of diagnostic material is used to mean the number of times or frequency at which the diagnostic material has served as a decisive factor for determining causes of an event. Furthermore, an expression "data of diagnostic material are stored according to closeness-of-fit" is used to cover both: a mode where the data of diagnostic material are stored together with data obtained by quantifying the closeness-of-fit; and a mode where the data of diagnostic material are arranged in a storage area in order according to the closeness-of-fit.

This configuration realizes that when event data of trouble is input, data of diagnostic material to determine its causes are output in order according to the closeness-of-fit. Thus, a person handling the trouble can determine the causes of the trouble more efficiently.

Preferably, the support system for trouble handling further includes: an actual result storage unit in which event data of troubles, data of diagnostic material having been selected in determining causes of the troubles, and handling procedure data of procedures having been performed to handle the troubles are stored as actual cases of troubles; and a closeness-of-fit decision unit to perform a process of deciding closeness-of-fit of data of diagnostic data material to each one of the event data according to the number of times or frequency at which each one of the data of diagnostic material has been selected among the cases of troubles stored in the actual result storage unit.

This configuration realizes that the closeness-of-fit of the data of diagnostic material to each of the event data is decided according to the number of times or frequency at which each one of the data of diagnostic material has been selected among the cases of troubles stored in the actual result storage unit. Thus, maintenance can be performed automatically to present handling procedures according to the closeness-of-fit of the data of diagnostic material, without requiring the laborious work of updating.

Preferably, the diagnostic path storage unit in the support system for trouble handling further stores therein data to decide degrees of priority of the handling procedure data for the respective ones of the causes, wherein according to the degrees of priority, the handling procedure presentation unit presents the handling procedure data extracted from the diagnostic path storage unit.

Preferably, the diagnostic path storage unit stores, as the data to decide the degrees of priority, at least one of: time required for each handling procedure; cost required to perform each handling procedure; and average time from after each handling procedure has been performed until the same event occurs due to the same cause in the same equipment.

It is also possible to allow a user to input selection to select which of the data to decide the degrees of priority, using, as the data to decide the degrees of priority, at least two of: (1) time required for each handling procedure; (2) cost required to perform each handling procedure; and (3) time from after each handling procedure has been performed until the same event occurs due to the same cause in the same equipment.

Preferably, the handling procedure data in the support system for trouble handling contains action content to describe individual actions.

Also preferably, the support system for trouble handling further includes: an input unit to selectively or optionally input a combination of the event data, the data of diagnostic material and the handling procedure data; and a new path registration unit to interrelate and store, in the diagnostic path storage unit, the event data, the data of diagnostic material and the handling procedure data that are input by the input unit.

This configuration makes it possible to store, at any time, new combinations of the event data, the data of diagnostic material and the handling procedure data. Thus, a support system for trouble handling that does not require laborious work for maintenance can be realized.

For achieving the above-described object, a terminal according to the present invention is a terminal suitable to be connected to any one of the above-described support systems for trouble handling, and includes: an event input unit to input event data of troubles occurring in an equipment; a diagnostic material input unit to receive data of diagnostic material output by the diagnostic material presentation unit and to selectively input some of data of diagnostic material as selected from the received data of diagnostic material; and a handling procedure display unit to receive handling procedure data output by the handling procedure presentation unit and to display the received handling procedure data.

BRIEF DESCRIPTION OF THE DRAWINGS

FIG. 2A to FIG. 2D are explanatory charts showing examples of data stored in the service support system.

FIG. 3A and FIG. 3B are explanatory charts showing examples of data stored in the service support system.

FIG. 5 is an example of a symptom selection screen displayed on the SE terminal by the service support system.

FIG. 6 is an example of a diagnostic material selection screen displayed on the SE terminal by the service support system.

FIG. 7 is an example of a handling procedure selection screen displayed on the SE terminal by the service support system.

FIG. 8 is an example of an action list screen displayed on the SE terminal by the service support system.

FIG. 9 is an example of a screen, explaining an action, displayed on the SE terminal by the service support system.

FIG. 10 is an example of a repair report input screen.

FIG. 11 is an example of a repair report input screen for a service engineer to register a new path on.

FIG. 12 is an example of a screen, displayed on the SE terminal subsequently to the screen of FIG. 11, for a service engineer to register a new path on.

FIG. 14 is an example of a screen displayed on the SE terminal subsequently to the screen of FIG. 13.

FIG. 15 is an example of a screen displayed on the SE terminal subsequently to the screen of FIG. 14.

BEST MODE FOR CARRYING OUT THE INVENTION

Hereinafter, an embodiment of the present invention will be described with reference to the drawings.

[Outline of Service Support System]

A service support system according to the present embodiment is such a system as operated and managed by an equipment maker for supporting service engineers to, e.g., repair and maintain equipment supplied to users (hereafter referred to as user equipment).

Figure 1:
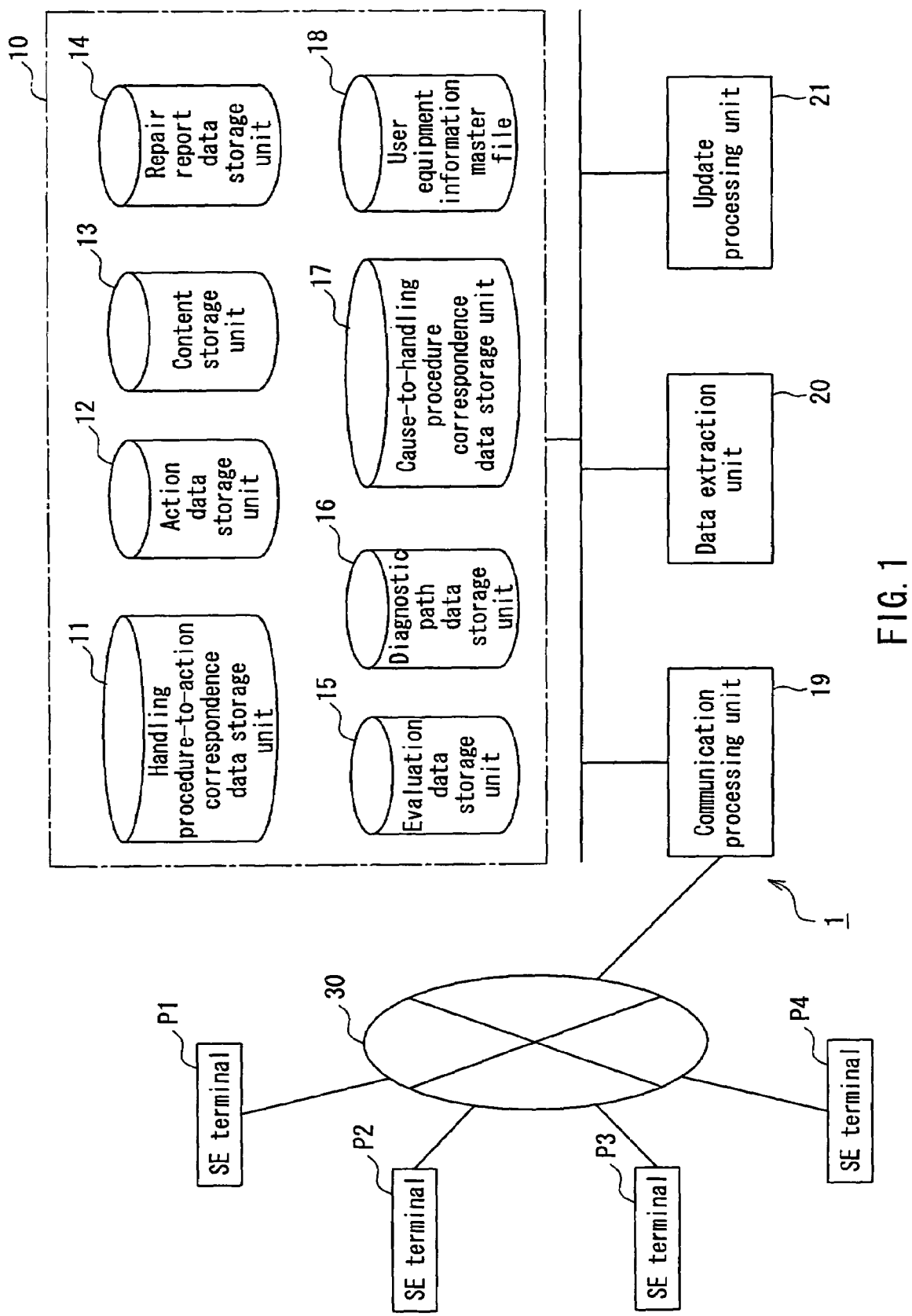
FIG. 1 is a block diagram showing a schematic configuration of a service support system and an SE terminal according to an embodiment of the present invention.

Hence, as shown in FIG. 1, a service support system 1 according to the present embodiment is connected, via internet 30, to SE terminals $P_1$, $P_2$ . . . (hereafter referred to as SE terminal P) which service engineers carry. An optional portable type terminal having connectability to the Internet, such as personal computer, PDA or cellular phone, can be used for the SE terminal P. In order to do repair or maintenance work, a service engineer connects an SE terminal P, which the service engineer carries, to the service support system 1 via the internet 30, and does the work according to an online manual provided by the service support system 1 to the SE terminal P.

For doing repair work, the service engineer first inputs a failure symptom of the user equipment to the SE terminal P. Since the same failure symptom often is caused by various causes, it is important to determine causes of the failure correctly and quickly in order to repair the failure properly and efficiently. For each of the expectable failures in each of various kinds of user equipment, symptoms and their causes together with diagnostic material to determine the causes by the symptoms are interrelated and stored in a database in the service support system 1. When the service engineer inputs a symptom to the SE terminal P, the service support system 1 selects candidates of diagnostic material considered to be effective for determining the causes, and displays the candidates in the proper order of priority on a display of the SE terminal P. This order of priority (closeness-of-fit) of the diagnostic material is decided by the service support system 1 on the basis of accumulated cases of handling failures, and is updated appropriately when new cases of handling are accumulated, as will be described later.

The service engineer determines the causes of the failure by doing confirmation work, in order of priority from high to low, on the diagnostic material displayed on the SE terminal P. After the causes are determined, the service support system 1 selects, from the database, descriptions of handling processes fit for the causes, and displays the descriptions in proper order of priority on the display of the SE terminal P. Thereby, the service engineer can proceed with the work, as the service engineer watches the descriptions displayed on the display of the SE terminal P. Thus, the service engineer can do the repair or maintenance work properly and efficiently.

After the repair work, the service engineer prepares a repair report on the SE terminal P. For this report, information is input such as: information about the user (e.g. user name); information about the failed user equipment (e.g.

model name and equipment ID); the symptoms of the failure; the diagnostic material having served as a decisive factor for determining the causes; and information about e.g. the handling work done. The information input to the repair report by the service engineer is sent from the SE terminal P to the service support system 1. Based on this information, the service support system updates the database storing the diagnostic material, and also updates the order of priority of the diagnostic material and the handling procedure.

[Configuration of Service Support System]

Here, an example of configuration of the service support system 1 will be described with reference to FIG. 1 and FIG. 2. As shown in FIG. 1, the service support system 1 includes: a data storage unit 10 having a handling procedure-to-action correspondence data storage unit 11, an action data storage unit 12, a content storage unit 13, a repair report data storage unit 14 (actual result storage unit), an evaluation data storage unit 15, a diagnostic path data storage unit 16 (diagnostic path storage unit), a cause-to-handling procedure correspondence data storage unit 17, a user equipment information master file 18, and so on; a communication processing unit 19; a data extraction unit 20 (diagnostic material presentation unit/handling procedure presentation unit), an update processing unit 21 (closeness-of-fit decision unit/new path registration unit); and so on.

For each of user equipment models, as shown in FIG. 2A, codes of trouble handling procedures and codes of one or plural actions to compose each trouble handling procedure are recorded in the handling procedure-to-action correspondence data storage unit 11, with both codes being interrelated with each other. Action is a unit of work done by a service engineer, such as "confirm", "exchange", "adjust" or the like. Each action is not necessarily composed of a single operation, but can include a series of operations. For example, an action "to exchange a seal" includes not only an operation to exchange a seal, but also an accompanying operation such as "to take off a cover (at the location of the seal to be exchanged)". In the case of the example shown in FIG. 2A, one trouble handling procedure SR0302 for an equipment model HA-8160 is composed of four actions A011, A239, A021 and A012.

As to all actions for each user equipment, as shown in FIG. 2B, action numbers, time required for each action, price of parts needed for each action, and hyperlink to action content corresponding to each action are recorded in the action data storage unit 12, with these data being interrelated with each other. Action content is content for displaying a detailed description of the action on the SE terminal P in order for a service engineer to be able to refer to in the repair work, and is recorded in the content storage unit 13 as e.g. a file in HTML format or the like.

As shown in FIG. 2C, data of repair reports prepared by respective service engineers, after completion of the repair work, are recorded in the repair report data storage unit 14, with the data being interrelated with each other, wherein examples of such data are report number, model number of repaired user equipment, equipment ID of the user equipment, work date, code of failure symptom, code of diagnostic material having served as a decisive factor for determining cause, code of determined cause of failure, code of handling procedure having been referenced in repair work, and so on.

As shown in FIG. 2D, information to evaluate the order of priority of handling procedures for failures of respective equipment models is recorded in the evaluation data storage unit 15, the information being e.g. cause-based MTBF, MTBF, calculation completion report number, MTTR, cost and so on. MTBF means an average value of time from the time one failure occurs to the time the next failure occurs. On the other hand, unlike ordinary MTBF, "cause-based MTBF" represents an average value of time from the time one failure occurs to the time another failure based on the same cause occurs again. It is to be noted that the data recorded in the evaluation data storage unit 15 are updated appropriately by the update processing unit 21 on the basis of content in the repair report data storage unit 14, as will be described in detail later.

For each model of user equipment, as shown in FIG. 3A, the diagnostic path data storage unit 16 (diagnostic path storage unit) stores relations among symptom code, diagnostic material code and cause code, which is determined by the combination of symptom and diagnostic material. For instance, in the example shown in FIG. 3A, when "J23" is selected as a diagnostic material in the case where the symptom code for HA-8160 is "T11", then the cause code of the failure is determined as "R01". Note that records in the diagnostic path data storage unit 16 are sorted in order of equipment model names, and further that records for the same equipment model name are sorted in order of the symptom codes. In addition, records for the same symptom code are sorted by the diagnostic material code in order of such number of actual results, from large to small, that the diagnostic material codes have been used to determine causes of the symptom. More specifically, the example shown in FIG. 3A indicates that in the records with equipment model name "HA-8160" and symptom code "T11", the diagnostic material code "J23" has been the most frequently used, with "J02" having been the second most frequently used, as a decisive factor for determining causes in past repair cases. It is to be noted that the order of the diagnostic material codes in the diagnostic path data storage unit 16 is updated at predetermined timings by the update processing unit 21 on the basis of data accumulated in the repair report data storage unit 14, as will be described later.

For each model of user equipment, as shown in FIG. 3B, the cause-to-handling procedure correspondence data storage unit 17 stores relations between cause code and handling procedure code. For instance, the example of FIG. 3B indicates that with respect to HA-8160, four kinds of trouble handling procedures "SR0302", "SR0201", "SR0408" and "SR0409" exist when the cause of the trouble is determined as "R02".

The user equipment information master file 18 stores all warning messages which user equipment output. It also stores information about parts constituting the user equipment, and so on.

The communication processing unit 19 controls, via the internet 30, communication with external devices such as the SE terminal P. The data extraction unit 20 (diagnostic material presentation unit/handling procedure presentation unit) extracts data from respective units of the data storage unit 10 in accordance with predetermined conditions. The update processing unit 21 updates the order of priority of the diagnostic material, and so on.

[Operation of Service Support System]

Taking, as an example, the case of a failure of a user equipment (model name: HA-8160), the operations of the service support system 1 and the SE terminal P will be described specifically.

Figure 4:
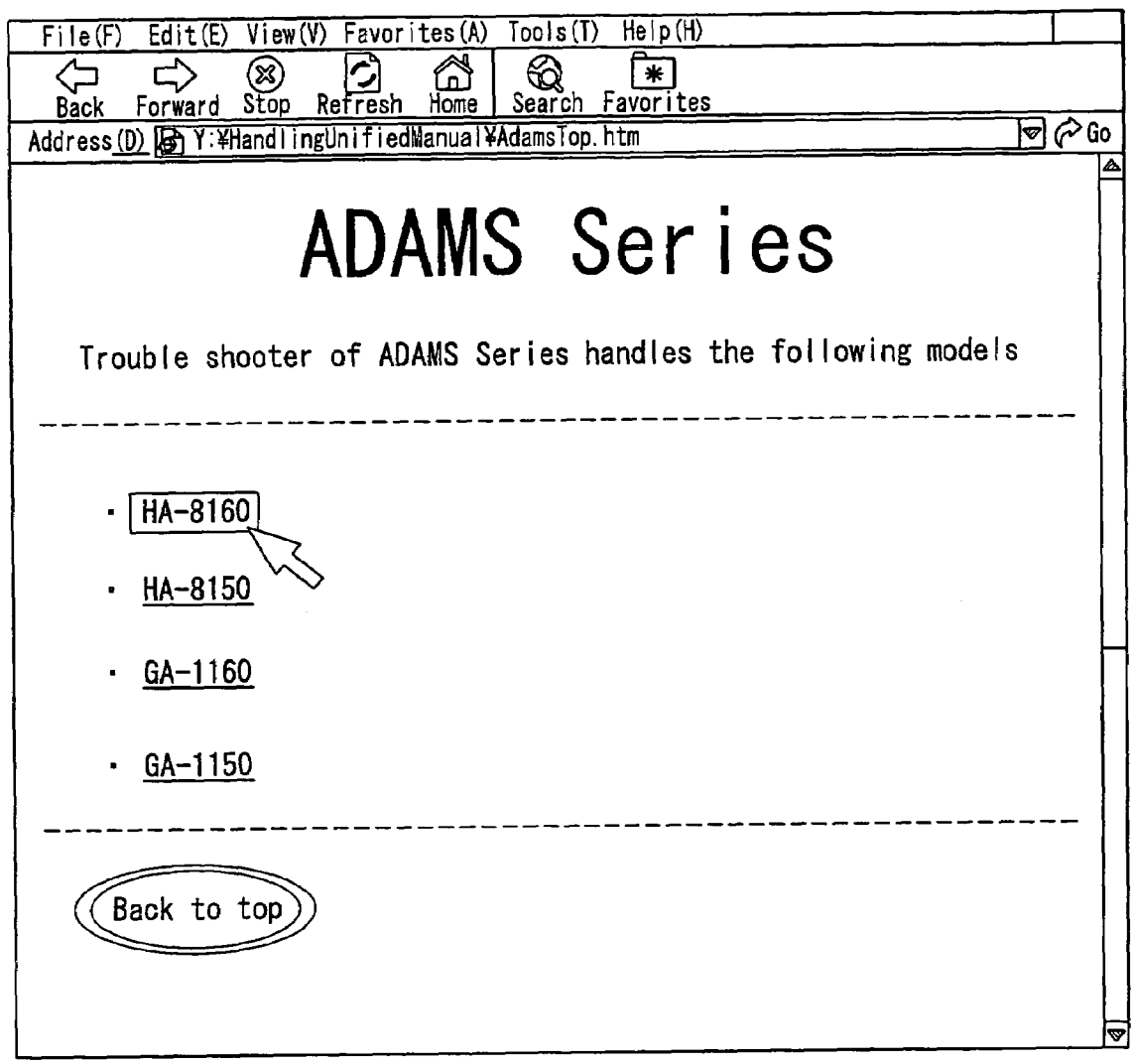
FIG. 4 is an example of a screen displayed when the SE terminal is connected to the service support system.

When a service engineer receives a communication from an equipment user and arrives at the user, the service engineer connects the SE terminal P to the service support system 1 via the Internet 30. Thereby, as shown in FIG. 4, e.g., a screen (equipment model selection screen) to selectively input a model name of a user equipment is displayed on the display of the SE terminal P. When the service engineer here selects the model name of the user equipment to be repaired as shown in FIG. 4, the selected model code is sent to the data extraction unit 20 via the communication processing unit 19 in the service support system 1. In accordance with the model code, the data extraction unit 20 extracts, from the content storage unit 13, content of a screen (symptom selection screen) to selectively input a symptom from a list of expectable troubles concerning the equipment model as shown in FIG. 5, for example. The extracted content is transferred to the communication processing unit 19, and is then sent to the SE terminal P. Thus, a screen such as shown in FIG. 5 is displayed on the display of the SE terminal P.

On the symptom selection screen displayed on the SE terminal, the service engineer selects a symptom that agrees with the symptom of the user equipment. It is assumed here that a trouble message "T11 Low flowrate" is displayed on the user equipment to be repaired, and that the service engineer has selected the "T11 . . . " on the symptom selection screen as shown in FIG. 5. The codes (Dxx, Exx, Txx and so on) each shown at the beginning of each symptom on the screen are symptom codes individually assigned to respective trouble symptoms. When the service engineer selects one of the symptoms, the symptom code is sent from the SE terminal P to the service support system 1.

When the service support system 1 receives the symptom code sent from the SE terminal P, the data extraction unit 20 extracts diagnostic material codes for determining causes of the symptom by referencing the diagnostic path data storage unit 16, using the received symptom code as a key. As described above, the diagnostic path data storage unit 16 stores diagnostic materials in order of such number of times, from large to small, that the diagnostic materials have served as decisive factors for determining causes of each symptom in past repair cases. The data extraction unit 20 sends the diagnostic material codes, having been extracted from the diagnostic path data storage unit 16, to the SE terminal P according to such order of priority. Thus, such screen (diagnostic material selection screen) as shown in e.g. FIG. 6 that displays diagnostic material, with the provided order of priority for determining the causes of the failure from the symptom is displayed on the display of the SE terminal P. In the example shown in FIG. 6, diagnostic material for determining causes of the trouble ("T11") are displayed with the order of priority (No. 1 etc.) being provided thereto. In FIG. 6, codes (Jxx) each shown after each order of priority are diagnostic material codes individually assigned to respective diagnostic material. Note that in FIG. 6 and later described FIG. 7 and FIG. 8, browser frames and the like are omitted in the drawing.

The service engineer confirms the diagnostic materials (confirmation items), in the order of priority from high to low, that are displayed on the diagnostic material selection screen. More specifically, in the example of FIG. 6, the service engineer first confirms whether or not there is liquid leak from an injection valve (No. 1 J23). If there is no liquid leak, the service engineer next confirms whether bubbles are being generated in flow channel of A liquid (No. 2 J02). If bubbles are found to be generated, the service engineer selects this confirmation item (No. 2 J02) on the diagnostic material selection screen. Thereby, the selected diagnostic material code is sent from the SE terminal P to the service support system 1.

When the service support system 1 receives the diagnostic material code sent from the SE terminal P, the data extraction unit 20 determines the cause by referencing the diagnostic path data storage unit 16, using the model name of the user equipment, the symptom code and the diagnostic material code as keys. For instance, assuming in the above case that data as shown in FIG. 3A are stored in the diagnostic path data storage unit 16, the cause code to be determined is "R02" since the equipment model name is "HA-8160", the symptom code is "T11", and the diagnostic material is "J02".

After determining the cause code, the data extraction unit 20 references the cause-to-handling procedure correspondence data storage unit 17 on the basis of this cause code, and extracts a handling procedure to handle the cause. For instance, if the cause code is "R02" in the case where the content of the cause-to-handling procedure correspondence data storage unit 17 is such data as shown in FIG. 3B, then four kinds of handling procedures "SR0302", "SR0201", "SR0408" and "SR0409" are extracted.

The data extraction unit 20 further extracts, from the handling procedure-to-action correspondence data storage unit 11 and the action data storage unit 12, information about actions constituting respective handling procedures having been extracted. The data extraction unit 20 furthermore extracts, from the evaluation data storage unit 15, MTTRs of the respective handling procedures having been extracted. And then, the data extraction unit 20 provides the extracted handling procedures with the order of priority in order of the MTTR values from small to large, and sends the handling procedures to the SE terminal P. Thereby, as shown in FIG. 7, such a screen (handling procedure selection screen) is displayed on the display of the SE terminal P that handling procedures to handle the cause "R02" are arranged in the order of MTTR from small to large.

The handling procedure selection screen, as described above, displays handling procedures that are determined by the selected combination of a trouble event and diagnostic material. In the example of FIG. 7, all handling procedures, which have been selected by the service support system 1 from the combination of the trouble event (event code "T11") selected on the event selection screen and the diagnostic material (diagnostic material code "J02") selected on the diagnostic material selection screen, are displayed with the order of priority being provided thereto. Note that for displaying handling procedures according to the present embodiment mode, it is possible to select the order of priority from three kinds: (1) order of MTTR from short to long; (2) order of MTBF from long to short; and (3) order of repair cost from low to high. In the example of FIG. 7, three handling procedures are displayed in the order of MTTR from short to long. However, if the service engineer selects "Order of MTBF" or "Order of cost", then the data extraction unit 20 references the evaluation data storage unit 15 according to that selection, and rearranges the handling procedures to be displayed. Although the order of MTTR, from small to large, is used in this example to initially display the handling procedure selection screen, it can also be such that the order of MTBF or the order of cost is initially displayed, and is rearranged according to the selection by the service engineer.

Now, when the service engineer selects the handling procedure "SR0302" which is displayed with top priority, the display screen of the SE terminal P is changed to an action list screen to list actions included in the selected handling procedure, e.g., as shown in FIG. 8. Each of the actions displayed on the screen shown in FIG. 8 is provided with a link. When the service engineer selects an action as shown in FIG. 8, action content corresponding to the action is extracted from the content storage unit 13 by the link provided to the selected action, and is displayed on the screen of the SE terminal P. For instance, if the service engineer selects the action [A011] on the screen shown in FIG. 8, then the screen display of the SE terminal P is changed to such screen as shown in e.g. FIG. 9. The service engineer does the repair work as the service engineer watches this screen. Note that action content is designed such that it is possible, depending on the need, to scroll a screen, enlarge a part of a screen, and switch screens back-and-forth.

After the work is done, the service engineer calls a repair report preparing screen on the SE terminal P as shown in FIG. 10, and inputs the necessary items. It is to be noted that in FIG. 10 and later described FIG. 11 to FIG. 16, browser frames and the like are omitted in the drawing. On this screen, a path input column 40 is provided. According to the above-described example, for instance: "T11" has been selected on the event selection screen of FIG. 5; "J02" has been selected on the diagnostic material selection screen of FIG. 6; and "SR0302" has been selected on the handling procedure selection screen of FIG. 7. Thus, the service engineer inputs these codes in the path input column 40, as shown in FIG. 10. The data having been input in the path input column 40 together with other data having been input to the repair report preparing screen are sent from the SE terminal P to the service support system 1. In the service support system 1, the update processing unit 21 stores the repair report data sent from the SE terminal P in the repair report data storage unit 14, as shown in e.g. FIG. 2C.

The foregoing is a description of the operations of the service support system 1 and the SE terminal P for a service engineer to do repair work.

[Update Processing in Data Storage Unit]

Based on the data stored in the repair report data storage unit 14, the service support system 1 periodically updates: the order of priority of the diagnostic material in the diagnostic path data storage unit 16; and various data in the evaluation data storage unit 15. This updating process either can be performed at regular time intervals such as once a day, once a month or the like, or performed every time a predetermined number of new repair report data are added to the repair report data storage unit 14.

As for the order of priority of the diagnostic material in the diagnostic path data storage unit 16, the update processing unit 21 calculates, from all actual results of repair stored in the repair report data storage unit 14, such respective numbers that respective diagnostic material codes have been used for each same symptom in each same equipment model. Based on the results of the calculation, the update processing unit 21 rearranges the record in the diagnostic path data storage unit 16 so as to arrange the diagnostic material for each symptom in each equipment model in the order of the number of times, from large to small, that the diagnostic material have served as decisive factors for determining causes in actual results of past repairs.

Furthermore, the update processing unit 21 updates content in the evaluation data storage unit 15 on the basis of the data stored in the repair report data storage unit 14. First, from records added to the repair report data storage unit 14 after previous updating process, the update processing unit 21 extracts records that agree with each other as to all the equipment ID, the symptom and the cause, and calculates intervals between work dates in such records. For instance, in the example of FIG. 2C, the record of the report number "123456" agrees with the record of the report number "123452" as to all the equipment ID, the symptom and the cause. Thus, the update processing unit 21 calculates the difference between the date data recorded in the work date columns of these records. In this case, the difference between Mar. 26, 2002 and Mar. 12, 2002 is calculated to be 14 days. More specifically, it is indicated that, 14 days after repair work was done according to the handling procedure "SR0302" on Mar. 12, 2002 for a failure of a symptom due to a cause in a user equipment, a failure of the same symptom due to the same cause occurred in the same user equipment. Next, using this value, the update processing unit 21 updates the value of the cause-based MTBF as to that equipment model name (HA-8160) and that handling procedure (SR0302). In the example shown in FIG. 2D, the value of the cause-based MTBF in the handling procedure "SR0302" for HA-8160 is 193 days. However, by adding the data of 14 days as calculated above:

$$(193 \times 23 + 14)/(23+1) = 186$$

Based on this, the days of the cause-based MTBF, the number of samples and the calculation completion report number are updated to 186, 24 and 123452, respectively.

According to the above process, the update processing unit 21 updates the order of priority of the diagnostic material, the values of the cause-based MTBF, and the like at predetermined timings.

[Process of Newly Creating Diagnostic Path]

In the service support system 1 of the present embodiment, a service engineer can add a new path to the diagnostic path data storage unit 16 according to the following procedure. Assume a case, for instance, where no appropriate diagnostic material has been displayed when a service engineer has accessed the service support system 1 from an SE terminal P for repairing a failure in a user equipment, so that the service engineer, by himself, has handled it appropriately. In such case, the service engineer can register, to the service support system 1, the content of the work done himself.

Hereafter, this registration procedure will be described, using a specific example. It is assumed here that a warning message "T11: Low flowrate" has been displayed on a user equipment, and hence that a service engineer has accessed the service support system 1 from an SE terminal P, but that no diagnostic material corresponding to the symptom has been displayed. It is further assumed that when the service engineer has then checked by himself, it has been found that "Bubbles are being generated in flow channel of A liquid", and that its cause is "Bad connection between eluant tube and rear panel". It is furthermore assumed that for repairing this failure, the service engineer has sequentially performed four actions: replacing of replacement seal (action code: A011); retightening of connecting portion between eluant tube and rear panel (A239); confirming of piping pressure (A021); and confirming of measurement operation (A012).

Figure 11:
Figure 12:
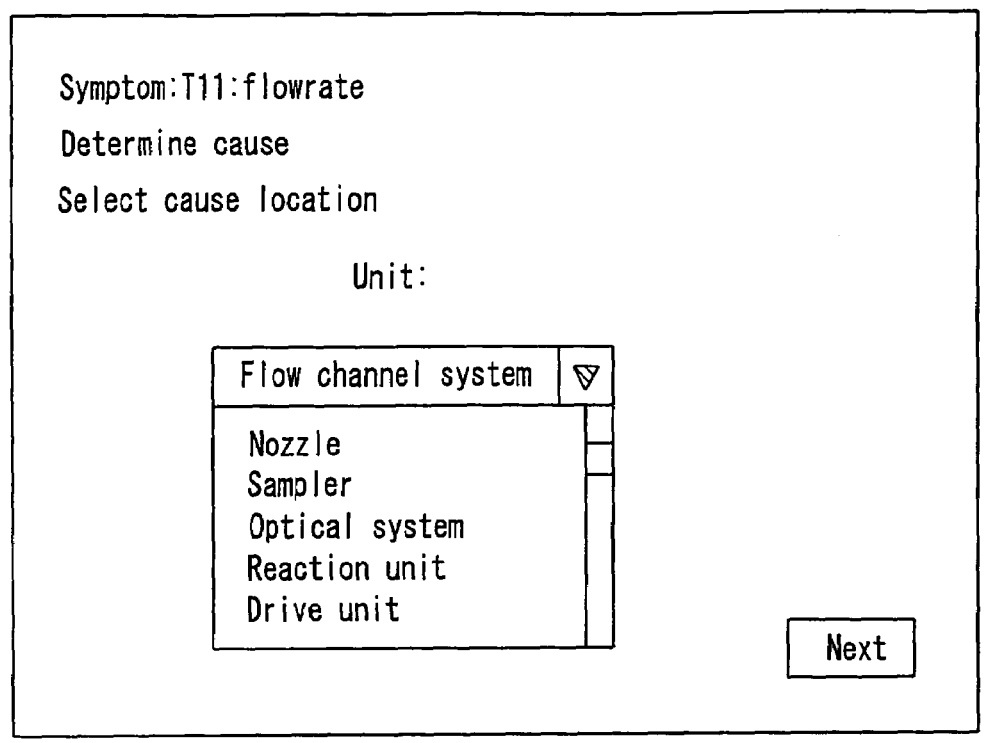

On the repair report preparing screen displayed on the SE terminal as shown in FIG. 11, the service engineer first selects a symptom in the path input column 40. Here, the symptom "T11: Low flowrate" is selectively input. Note here that all warning messages output by the user equipment are preliminarily registered in the user equipment information master file 18 of the service support system 1, so that a list of all the warning messages is displayed in the path input column 40. Accordingly, the service engineer can select an applicable one from the displayed list of warning messages. However, it also can be so designed that symptom codes and descriptions thereof for symptoms not registered in the master file can be newly created. When the service engineer presses "New Creation" button, the screen of the SE terminal P is changed to a screen, as shown in FIG. 12, to fill in causes. Now, the service engineer inputs location (name of unit) causing the failure. Here, "Flow Channel System" is selected, and "Next" button is pressed, whereby the screen of the SE terminal P is changed to a screen as shown in FIG. 13.

Figure 13:
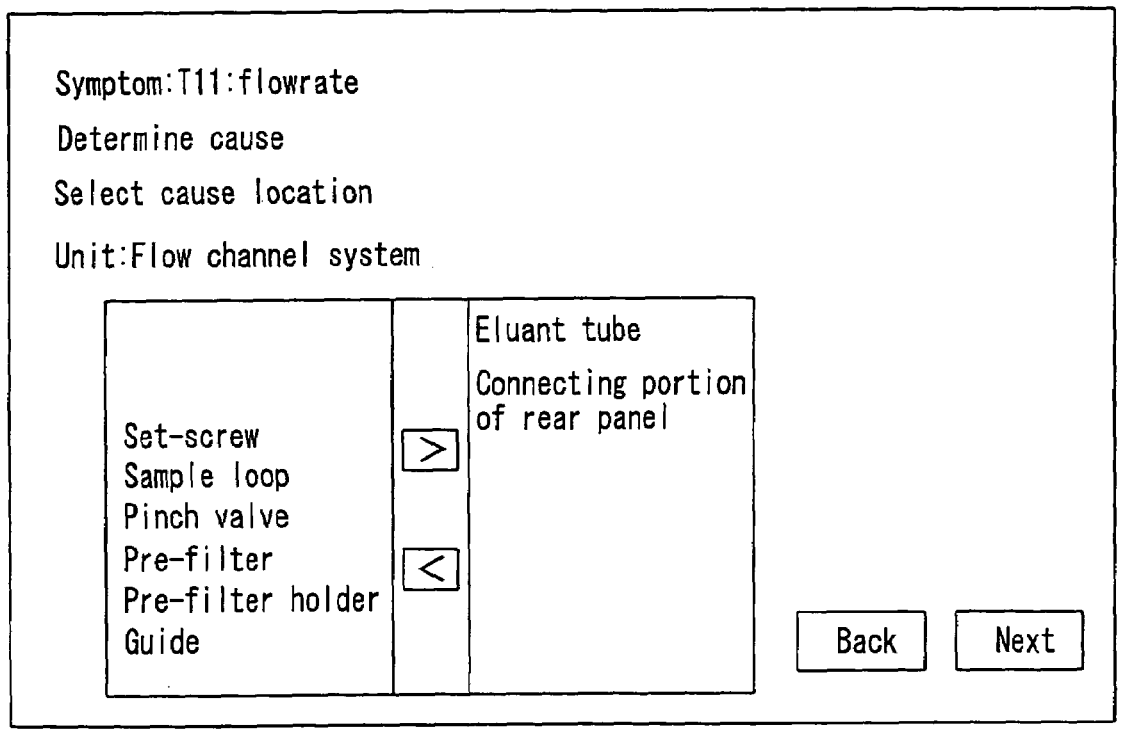
FIG. 13 is an example of a screen displayed on the SE terminal subsequently to the screen of FIG. 12.

On the screen shown in FIG. 13, parts of the flow channel system are extracted from the user equipment information master file 18, and are displayed as a list in a part list column 41. The service engineer selects applicable parts from the list, and presses an addition button 42 for addition to a cause location column. Here, "Eluant tube" and "Connecting portion of rear panel" are selected and added. The added parts are displayed in the cause location column 43.

When the service engineer presses "Next" button after the determination of the cause location, the screen of the SE terminal is changed to a screen as shown in FIG. 14. Now, the service engineer selects factor (stress) having served as the cause. Here, "Bad connection" is selected. When the service engineer presses the "Next" button, the screen of the SE terminal is changed to a screen as shown in FIG. 15.

Now, the service engineer inputs a diagnostic criterion for determining causes, using an optional character string. It is to be noted that considerations should be made here to make the input diagnostic criterion objectively different from existing diagnostic criteria. This is to allow other service engineers to be able to understand differences among diagnostic criteria. In the example of FIG. 15, the diagnostic criterion that the service engineer has input is "Bubbles are being generated in flow channel of A liquid".

Figure 16:
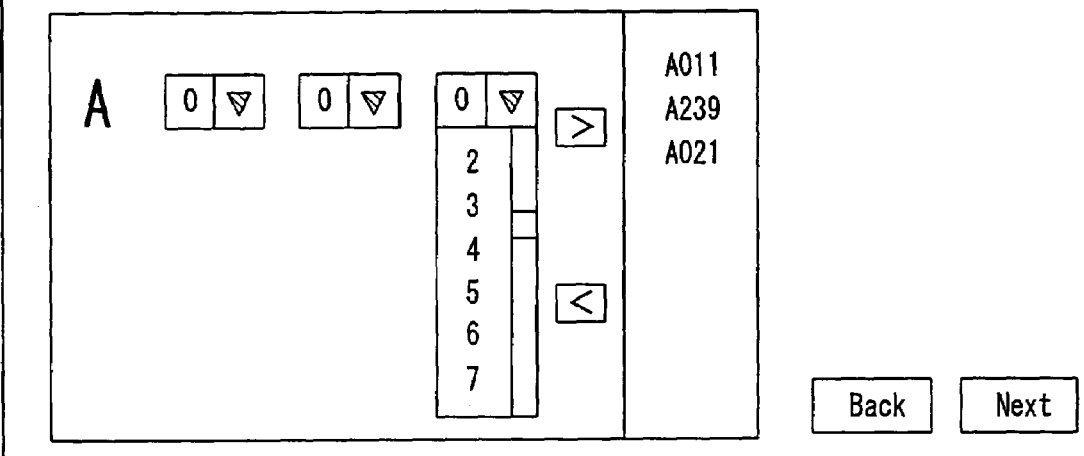
FIG. 16 is an example of a screen displayed on the SE terminal subsequently to the screen of FIG. 15.

When the diagnostic criterion is input, the screen of the SE terminal is changed to a screen as shown in FIG. 16. On this screen, by the action numbers "A011", "A239", "A021" and "A012", the service engineer inputs the content of the work done for repairing the failure.

The information thus input by the service engineer is registered by the update processing unit 21 in the diagnostic path data storage unit 16, the cause-to-handling procedure correspondence data storage unit 17 and the handling procedure-to-action correspondence data storage unit 11, so as to become usable by other service engineers.

Figure 17:
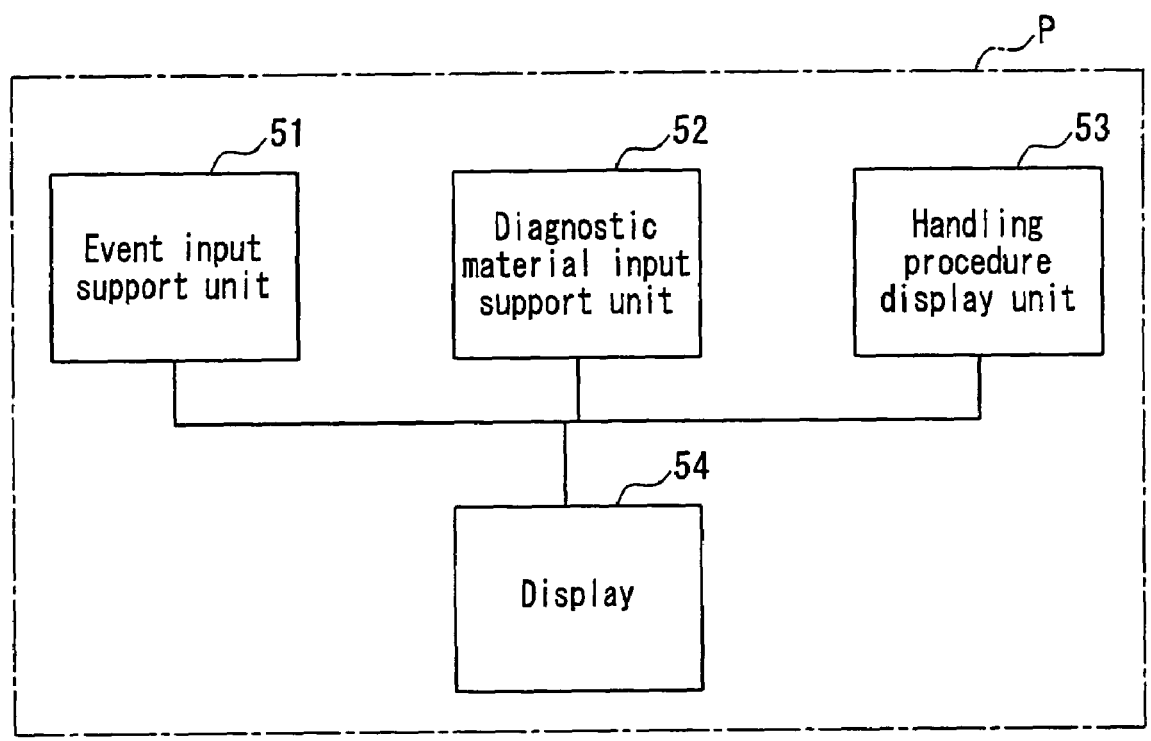
FIG. 17 is a block diagram showing a schematic configuration of the SE terminal.

Here, referring to FIG. 17, a schematic configuration of the SE terminal P will be described. The SE terminal P is configured to be an optional portable type terminal having internet connectability as described above, and includes an event input support unit 51, a diagnostic material input support unit 52 and a handling procedure display unit 53 as shown in FIG. 17. The SE terminal P also includes: a display 54 capable of displaying such screens as shown in FIG. 4 to FIG. 16; and a GUI (not shown) that enables selection of data displayed on the display 54 and also enables input in input columns displayed on the display 54. It is also preferable to configure the display 54 of the SE terminal as a touch panel.

The event input support unit 51 receives content data of the equipment model selection screen (refer to e.g. FIG. 4) and the symptom selection screen (refer to e.g. FIG. 5) from the service support system 1, and displays them on the display 54, and further allows a service engineer to input event data of troubles occurring in equipment. The diagnostic material input support unit 52 receives content data of the diagnostic material selection screen (refer to e.g. FIG. 6) from the service support system 1, and displays them on the display 54, and further allows the service engineer to selectively input some of the data of diagnostic material. The handling procedure display unit 53 receives content data of the handling procedures (refer to e.g. FIG. 7 to FIG. 9) sent from the service support system 1, and displays the received handling procedure data on the display 54.

According to the present embodiment, examples of data in the sequential file have been illustrated above in FIG. 2A to FIG. 2D, FIG. 3A and FIG. 3B as examples in respective storage units of the data storage unit 10. However, the data structure is not limited to the sequential file. In the diagnostic path data storage unit 16 as well, the order of priority of the diagnostic material having been illustrated above is represented by an arrangement order of sequential records. However, it is also possible to allow each record to have an attribute representing order of priority of diagnostic material. Furthermore, the logical structure of the data storage unit 10 having been illustrated in the present embodiment is only an example. The data structure can be optically changed, considering e.g. the efficiency of data retrieval and efficient use of storage capacity.

INDUSTRIAL APPLICABILITY

As described in the foregoing, according to the present invention, causes of failures can be efficiently determined, and such support system for trouble handling can be realized that can provide an online manual that does not requires laborious work for updating.

The invention claimed is:

1. A support system for trouble handling comprising:
a diagnostic path storage unit to store a list of event data of troubles capable of occurring in an equipment, a list of data of diagnostic material for determining causes of the events, and a list of handling procedure data corresponding to the causes, and further store interrelations among these data;
a diagnostic material presentation unit to receive event data input thereto, and to extract, from the diagnostic path storage unit, data of diagnostic material relating to the event data input thereto, and further to output the extracted data of diagnostic material; and
a handling procedure presentation unit to receive some of the data of diagnostic material output by the diagnostic material presentation unit and selectively input thereto, and to extract, from the diagnostic path storage unit, handling procedure data relating to such cause as determined by the data of diagnostic material selectively input thereto, and further to output the extracted handling procedure data,
wherein the data of diagnostic material for respective event data are stored in the diagnostic path storage unit according to closeness-of-fit, and
wherein the diagnostic material presentation unit outputs the extracted data of diagnostic material in order according to the closeness-of-fit.

2. The support system for trouble handling according to claim 1, which further comprises:
an actual result storage unit in which event data of troubles, data of diagnostic material having been selected in determining causes of the troubles, and handling procedure data of procedures having been performed to handle the troubles are stored as actual cases of troubles; and
a closeness-of-fit decision unit to perform a process of deciding closeness-of-fit of data of diagnostic material to each one of the event data according to number of times or frequency at which each one of the data of diagnostic material has been selected among the cases of troubles stored in the actual result storage unit.

3. The support system for trouble handling according to claim 2, wherein the closeness-of-fit decision unit performs the process of deciding closeness-of-fit at predetermined time intervals.

4. The support system for trouble handling according to claim 2, wherein the closeness-of-fit decision unit performs the process of deciding closeness-of-fit every time a predetermined number of cases of troubles are added to the actual result storage unit.

5. The support system for trouble handling according to claim 1,
wherein the diagnostic path storage unit further stores therein data to decide degrees of priority of the handling procedure data for the respective ones of the causes, and
wherein according to the degrees of priority, the handling procedure presentation unit presents the handling procedure data extracted from the diagnostic path storage unit.

6. The support system for trouble handling according to claim 5, wherein the diagnostic path storage unit stores, as the data to decide the degrees of priority, time required for each handling procedure.

7. The support system for trouble handling according to claim 5, wherein the diagnostic path storage unit stores, as the data to decide the degrees of priority, cost required to perform each handling procedure.

8. The support system for trouble handling according to claim 5, wherein the diagnostic path storage unit stores, as the data to decide the degrees of priority, average time from after each handling procedure has been performed until the same event occurs due to the same cause in the same equipment.

9. The support system for trouble handling according to claim 5, which allows a user to input selection to select which of the data to decide the degrees of priority, using, as the data to decide the degrees of priority, at least two of: (1) time required for each handling procedure; (2) cost required to perform each handling procedure; and (3) time from after each handling procedure has been performed until the same event occurs due to the same cause in the same equipment.

10. The support system for trouble handling according to claim 1, wherein the handling procedure data contains action content to describe individual actions.

11. The support system for trouble handling according to claim 1, which further comprises:
an input unit to selectively or optionally input a combination of the event data, the data of diagnostic material and the handling procedure data; and
a new path registration unit to interrelate and store, in the diagnostic path storage unit, the event data, the data of diagnostic material and the handling procedure data that are input by the input unit.

12. A terminal to be connected to the support system for trouble handling according to claim 1, the terminal comprising:
an event input unit to input event data of troubles occurring in an equipment;
a diagnostic material input unit to receive data of diagnostic material output by the diagnostic material presentation unit and to selectively input some of data of diagnostic material as selected from the received data of diagnostic material; and
a handling procedure display unit to receive handling procedure data output by the handling procedure presentation unit and to display the received handling procedure data.

* * * * *